United States Patent
Krishnamurthy et al.

(10) Patent No.: US 10,949,252 B1
(45) Date of Patent: Mar. 16, 2021

(54) BENCHMARKING MACHINE LEARNING MODELS VIA PERFORMANCE FEEDBACK

(71) Applicant: Amazon Technologies, Inc., Seattle, WA (US)

(72) Inventors: Sandeep Krishnamurthy, Santa Clara, CA (US); Jiajie Chen, San Bruno, CA (US); Jonathan Esterhazy, Alameda, CA (US); Naveen Mysore Nagendra Swamy, Campbell, CA (US); Ruofei Yu, Los Altos, CA (US); Yao Wang, Sunnyvale, CA (US); Roshani Nagmote, San Mateo, CA (US); Hagay Lupesko, San Mateo, CA (US); Vikram Madan, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 238 days.

(21) Appl. No.: 15/895,747

(22) Filed: Feb. 13, 2018

(51) Int. Cl.
*G06F 9/48* (2006.01)
*G06N 20/00* (2019.01)

(52) U.S. Cl.
CPC .......... *G06F 9/4881* (2013.01); *G06N 20/00* (2019.01)

(58) Field of Classification Search
CPC .............................. G06F 9/4881; G06N 20/00
See application file for complete search history.

(56) References Cited

U.S. PATENT DOCUMENTS

| | | | | |
|---|---|---|---|---|
| 8,744,890 B1 * | 6/2014 | Bernier | ............ | G06Q 10/06316 705/7.16 |
| 2008/0195577 A1 * | 8/2008 | Fan | ................... | G06F 16/24545 |
| 2013/0346988 A1 * | 12/2013 | Bruno | ................... | G06F 9/5066 718/102 |
| 2014/0156632 A1 * | 6/2014 | Yu | ..................... | G06F 16/24545 707/713 |
| 2014/0214880 A1 * | 7/2014 | Chi | ..................... | G06F 16/2453 707/768 |
| 2017/0076246 A1 * | 3/2017 | Volkov | ..................... | G06N 5/04 |
| 2017/0126795 A1 * | 5/2017 | Kumar | ................ | H04L 41/5012 |
| 2017/0147985 A1 * | 5/2017 | Sampath | ................ | G06N 20/00 |
| 2017/0300359 A1 * | 10/2017 | Kollur | .................. | G06F 9/5022 |
| 2018/0032387 A1 * | 2/2018 | Hiran | ................. | G06F 11/3006 |
| 2018/0060394 A1 * | 3/2018 | Gawande | .............. | G06F 9/5022 |
| 2018/0165604 A1 * | 6/2018 | Minkin | ................. | G06Q 10/06 |

(Continued)

OTHER PUBLICATIONS

Coleman, Cody, et al., "DAWNBench: An End-to-End Deep Learning Benchmark and Competition", Stanford DAWN Project, pp. 1-4, Retrieved from the internet: http://www-cs.stanford.edu/~deepakn/assets/papers/dawnbench-sosp17.pdf.

*Primary Examiner* — Benjamin C Wu

(74) *Attorney, Agent, or Firm* — Nicholson De Vos Webster & Elliott LLP

(57) ABSTRACT

Techniques for benchmarking a machine learning model/algorithm are described. For example, in some instances a method includes generating an execution plan for benchmarking of at least one task corresponding to a machine learning model based on an identified machine learning model, identified training data, and at least one objective for the benchmarking job; receiving execution statistics about the execution of the task as a part of the benchmarking job according to the execution plan; and updating the execution plan based at least in part on the received execution statistics of the task.

20 Claims, 16 Drawing Sheets

(56) References Cited

U.S. PATENT DOCUMENTS

| | | | | |
|---|---|---|---|---|
| 2018/0314533 A1* | 11/2018 | Azhen | ............... | H04L 41/0813 |
| 2019/0019111 A1* | 1/2019 | Sun | ................ | G06F 11/3688 |
| 2019/0026634 A1* | 1/2019 | Homeyer | ............. | G06Q 10/103 |
| 2019/0102716 A1* | 4/2019 | Kass | ............... | G06Q 10/06313 |
| 2019/0206095 A1* | 7/2019 | Xing | ............... | G06N 3/084 |
| 2019/0266014 A1* | 8/2019 | Bahl | ............... | G06N 5/04 |
| 2019/0311287 A1* | 10/2019 | Chew | ............... | G06N 7/00 |
| 2020/0015101 A1* | 1/2020 | Kucera | ............... | H04W 52/54 |
| 2020/0183936 A1* | 6/2020 | Ramesh | ............... | G06N 3/08 |
| 2020/0210908 A1* | 7/2020 | Liang | ............... | G06F 17/18 |
| 2020/0264928 A1* | 8/2020 | Kalmuk | ............... | G06F 9/5011 |

* cited by examiner

EXEMPLARY TASK TEMPLATE 801

[TASK NAME] 803
PATTERNS (E.G., SPEED, TRAINING ACCURACY, TRAINING TIME, AND/OR VALIDATION ACCURACY) 805
METRICS (E.G., SPEED, TRAINING ACCURACY, TRAINING TIME, AND/OR VALIDATION ACCURACY) 807
COMPUTE METHOD (E.G., AVERAGE, LAST, TOTAL) 809
COMMAND TO EXECUTE (E.G., ALGORITHM/MODEL, DATA, MODE, EXECUTION HARDWARE) 811
HARDWARE TO USE (E.G., INSTANCE TYPE, NUMBER OF GPUS, ETC.) 813

EXEMPLARY TASK 821

[resnet50_cifar10_symbolic]
PATTERNS = 'Speed: (\d+\.\d+|\d+) samples/sec', 'Train-accuracy=(\d+\.\d+|\d+)', 'Time cost=(\d+\.\d+|\d+)'
METRICS = 'speed', 'TRAINING_ACC', 'TOTAL_TRAINING_TIME'
COMPUTE METHOD = 'AVERAGE', 'LAST', 'TOTAL'
COMMAND TO EXECUTE =PYTHON IMAGE_CLASSIFICATION/IMAGE_CLASSIFICATION.PY --MODEL
RESNET50_V1 --DATASET CIFAR10 --MODE SYMBOLIC --GPUS 8 --EPOCHS 20 --LOG-INTERVAL 50
NUMBER OF GPUS = 8

BENCHMARKING MACHINE LEARNING MODELS VIA PERFORMANCE FEEDBACK

BACKGROUND

The training and use of machine learning models, including deep learning models, is typically resource intensive. Small changes to a model can impact its accuracy, speed, and/or resource usage.

BRIEF DESCRIPTION OF DRAWINGS

Various embodiments in accordance with the present disclosure will be described with reference to the drawings, in which:

FIG. 8 illustrates embodiments an exemplary task template and an exemplary task.

DETAILED DESCRIPTION

Various embodiments of methods, apparatus, systems, and non-transitory computer-readable storage media for benchmarking machine learning models are described.

Benchmarking of a model allows for a user to see how the model compares to either itself (that is, prior iterations of the same model) or other models at a given point in time. Benchmarking a machine learning model may use powerful and expensive graphical processing units (GPUs) and central processor units (CPUs) and, as such, benchmarking operations typically are run offline and are time consuming, making them hard to manage. Benchmarking allows for a user to see an impact of a change to a model. For example, the impact on the performance of the model in terms of accuracy, speed, resources consumed, etc., may be found through benchmarking.

Unfortunately, traditional benchmarking requires a lot of knowledge about the hardware used, the model itself, etc. Detailed herein are embodiments that attempt to minimize user interaction for managing benchmarking jobs by having a benchmarking service determine an execution plan for benchmarking based on at least one stated objective, execution statistics for running the execution plan, etc.

Figure 1:
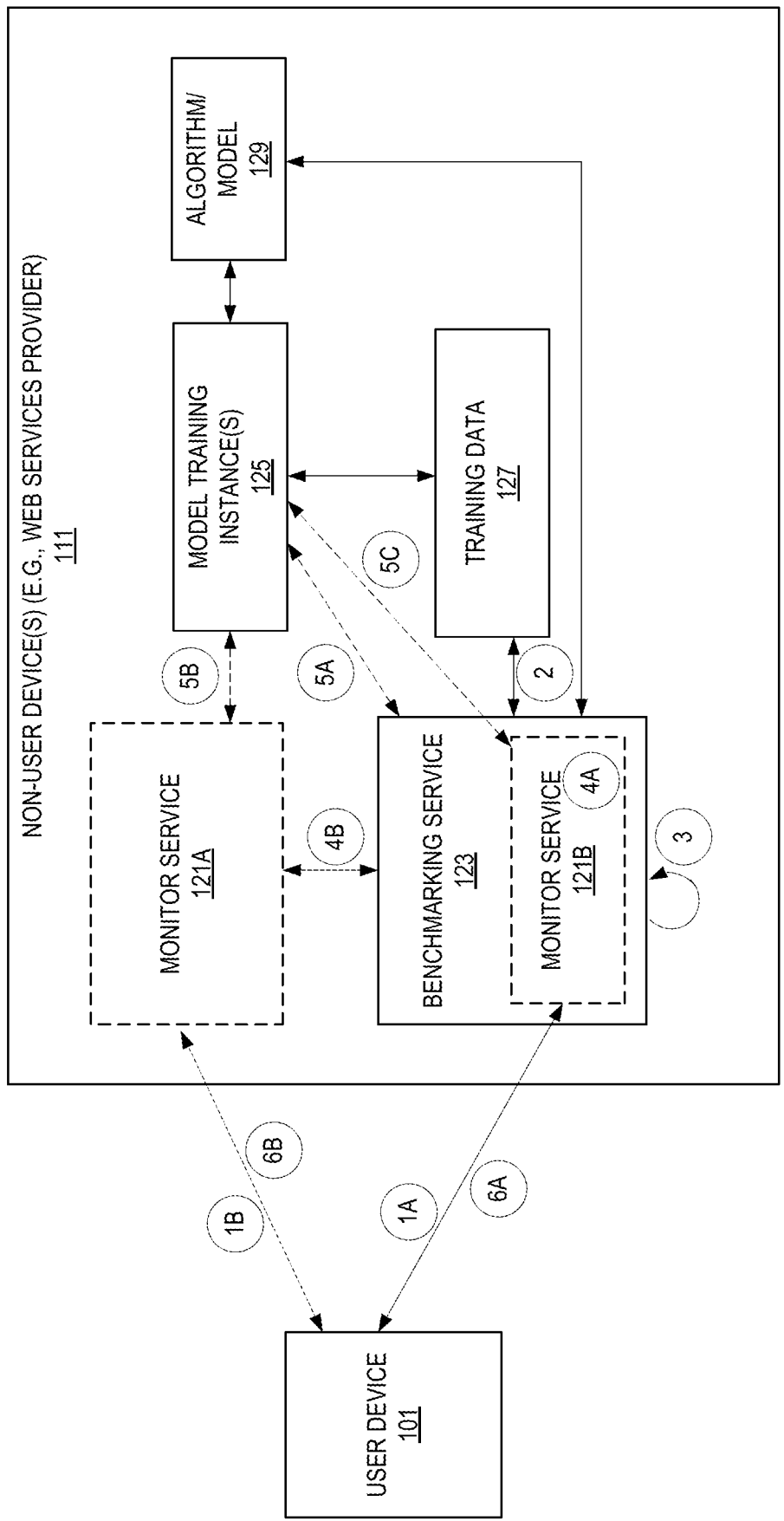
FIG. 1 illustrates embodiments of a system capable of benchmarking machine learning models.

FIG. 1 illustrates embodiments of a system capable of benchmarking machine learning models. In particular, a non-user device(s) 111, such as a web service provider server(s), is illustrated. While several components are shown, it should be understood that how the services, data, etc. are illustrated is not limiting. The constituency of individual services, etc., may be broken into further components, services combined, executed on one or more physical machines, etc. Further, the services illustrated are software executing on a hardware device, however, in some embodiments, the services are embedded in circuitry such as a part of an application specific integrated circuit (ASIC), or a field programmable gate array (FPGA).

A benchmarking service 123 generates an execution plan for a benchmarking job of one or more tasks, or jobs, to be executed for a model. The tasks may be training or inference. The benchmarking service 123 utilizes an algorithm/model 129 and training data 127 corresponding to the task to perform one or more benchmarking jobs for the model. Depending upon the embodiment, the benchmarking service 123 schedules a job to be executed as a model training instance, or instances, to train the model(s). A model training instance 125 is a container or virtual machine that trains a model or performs inferences.

The execution plan defines what hardware will run the job, what statistics to gather about the execution of the job, where to store results of the execution of the job, what triggers the job, etc. In some embodiments, the execution plan includes jobs or tasks of other users that are to be batched with the benchmarking job.

The benchmarking service 123 utilizes a template for configuring a benchmarking job in some embodiments. Tasks, or jobs, are defined through a task (or job) definition template. A task (or job) definition identifies a name of the task, metrics to generate based on collected execution data, and a command to execute (for example, an algorithm/model and data to use to train the algorithm/model). In some embodiments, a task further includes one or more of patterns for metrics (output format), a computational method to be used in generating a metric, and an indication of hardware resources to use (such as a number of GPUs). Additionally, the template includes a field for indicating how often to run the benchmarking job in some embodiments.

In some embodiments, a user, through user device 101, provides an objective for the benchmarking job, specifics of a task or tasks to be run as a job (a task definition), etc. that fulfill the template. Exemplary objectives for a benchmarking job include, but are not limited to: 1) a shortest possible time to complete the job; 2) a minimum hardware usage possible to complete the job; 3) accuracy of the model; 4) cost per transaction; and 5) a combination of time to complete, hardware usage, cost, and/or accuracy to complete the job. In some embodiments, the benchmarking service 123 uses information about other jobs (such as other jobs of the user and/or other jobs to be executed), previous execution of the task to be run as a job, previous execution of similar jobs, etc. in the generation of an execution plan according to the desired objective(s).

Further, in some embodiments, a user specifies hardware available to be used by the benchmarking job. For example, a hardware fleet size is specified and the benchmarking service 123 optimizes the scheduling of benchmarking jobs to use only hardware within the specified fleet size.

In some embodiments, the benchmarking service 123 generates an execution plan that batches benchmarking jobs with similar hardware and software requirements to run on the same setup as part of an execution plan. This batching avoids usage of multiple resources of a same type to reduce or satisfy an objective of minimal resource usage. However, this would typically lead to more time to complete. In some embodiments, the benchmarking service 123 generates an execution plan that utilizes higher-end, or more, hardware resources to perform a job quicker. In some embodiments, the benchmarking service 123 generates an execution plan that conforms to a cost to complete the job.

In some embodiments, the benchmarking service 123 updates an execution plan based on execution details of the benchmarking job and/or other jobs (such as how long the job(s) took, accuracy, etc.). The benchmarking service 123 tracks job execution details, or causes job execution details to be tracked, and uses this information to update the execution plan to be closer to the objective(s). Note the updating of an execution plan does not necessarily require user input. As such, the burden on the user is lowered.

In some embodiments, the benchmarking service 123 integrates with a metrics collector (shown as monitor service 121A or 121B) such that the metric collector initiates an execution of the benchmark job. For example, a monitor service 121A or 121B interfaces with the model training instance(s) 125 to initiate an execution of the benchmark job (execution of the algorithm/model 129 using training data 127) and generates metrics such as validation accuracy, training accuracy, time, speed, etc. based on the execution's statistics and provides this information to a user device 101.

In this illustration, there are several circles with numbers which are used to illustrate an exemplary flow according to some embodiments. At circle 1A, a user device 101 adds or modifies a task to be executed as a part of a job at the benchmarking service 123 along with at least one objective for the execution of a job using the added or modified task. In some embodiments, the user device 101 is used to add a trigger at 1A or 1B to the monitor service 121A or 121B to start the benchmarking job and/or to detail what metrics are to be provided to the user device 101.

The benchmarking service 123 retrieves the algorithm/model 129 and training data 127 to be used in the job at circle 2. The location of these items is provided by the task that was added or modified.

The benchmarking service 123 uses the retrieved algorithm/model 129 and training data 127 to generate an execution plan (if one does not exist) according to the at least one objective provided by the user at circle 3. In some embodiments, the retrieved algorithm/model 129 and training data 127 are subjected to training on a plurality of hardware configurations to ascertain run times, accuracy, etc. In other embodiments, training of the retrieved the algorithm/model 129 is simulated based on the algorithm/model 129 without subjecting it to actual training. This initial training, or simulation, provides a baseline of what hardware can execute the task and meet the objective(s). If there are no other similar algorithms/models, or other scheduled jobs, the benchmarking service 123 uses the baseline to develop an execution plan that attempts to meet the objective(s).

When an execution plan exists, the benchmarking service 123 uses information about previous execution(s) of the execution plan to determine if the execution plan should be updated. For example, when a previous number of executions of the execution plan do not meet the objective(s), the execution plan is updated to account for the changes. There are several reasons why an execution plan may not meet objectives, including changes made to the model and/or training data, lack of availability of batching, etc.

When there are other similar algorithms/models, other scheduled jobs, and/or previous runs, the benchmarking service 123 uses the baseline and takes into account this external information to generate or update the execution plan. For example, the benchmarking service 123 may batch benchmarking jobs with similar hardware and software requirements to run on the same setup as part of an execution plan.

At circle 4, in some embodiments, the generated or updated execution plan is provided, or access to the plan is provided, to a monitor service which enables execution of the execution plan. For example, in some embodiments, at circle 4A, a monitor service 121B of the benchmarking service 123 receives, or is provided access to, the generated or updated execution plan. In some embodiments, at circle 4B, a monitor service 121A external to the benchmarking service 123 receives, or is provided access to, the generated or updated execution plan.

At circle 5, model training instance(s) are instantiated and execute the task(s) of the job according to the execution plan. The execution statistics of the execution are provided (either during execution of the execution plan or as a result of completing execution) back to at least the benchmarking service 123, but may also be provided to the monitor service 121A or 121B. In some embodiments, at circle 5A, the benchmarking service 123 causes the instantiation and execution of the model training instance(s). In other embodiments, at circle 5B, the monitor service 121A causes the instantiation and execution. In other embodiments, at circle 5C, the monitor service 121B causes the instantiation and execution. The model training instance(s) may be executed within a container or as a virtual machine.

At circle 6A or 6B, calculated metrics are provided from a monitor service 121A or 121B, or the benchmarking service to the user device 101. The metrics are calculated using the execution statistics according to the task definition(s).

While not shown, in some embodiments, when a benchmarking result is worse than a threshold, code changes are automatically rolled back to a previous point that had better benchmarking results. For example, the underlying algorithm/model 129 is rolled back. Note that at least one previous algorithm/model 129 version should be available for this rollback. The threshold is set by the requesting user in most embodiments.

Figure 2:
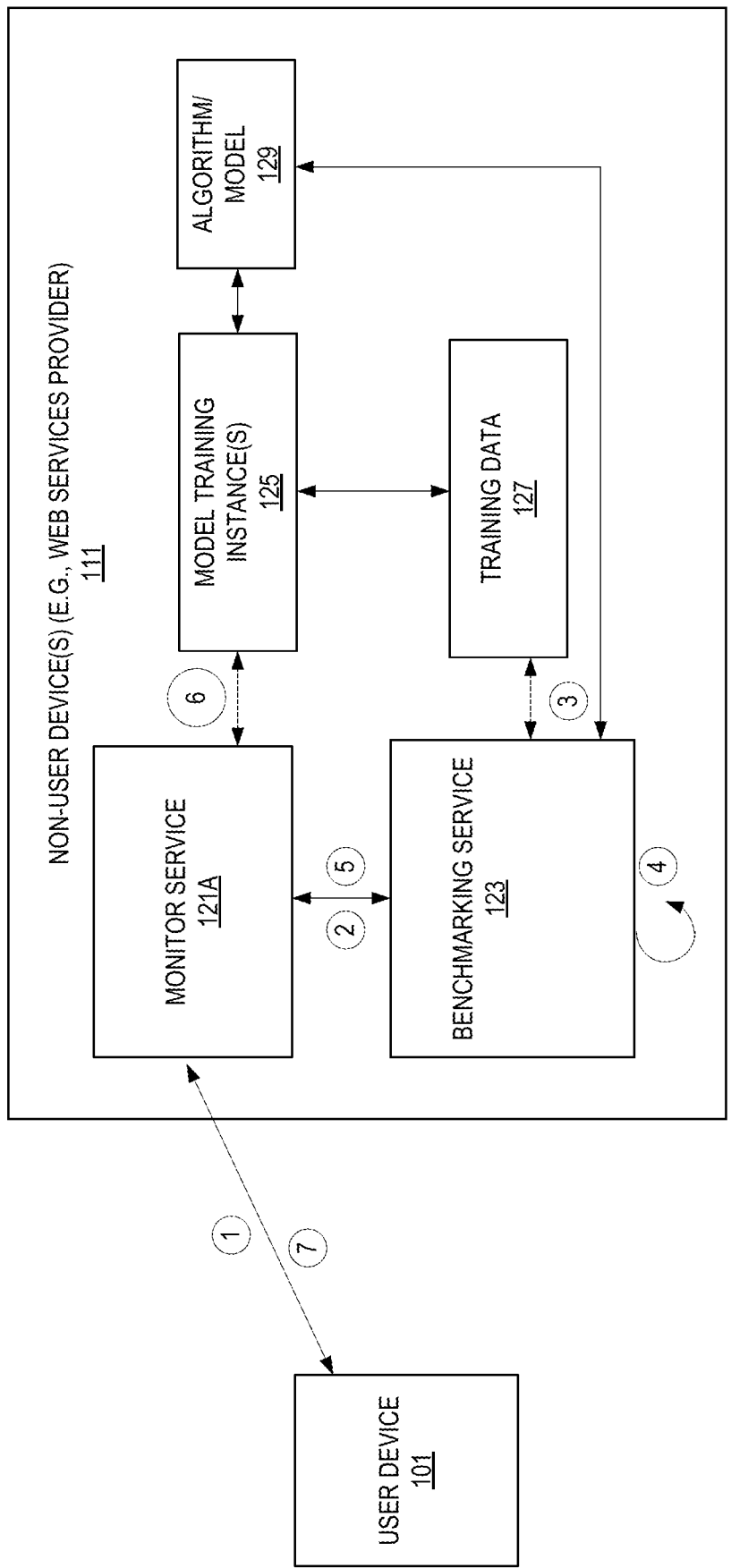
FIG. 2 illustrates embodiments of a system capable of benchmarking machine learning models.

FIG. 2 illustrates embodiments of a system capable of benchmarking machine learning models. A benchmarking service 123 generates an execution plan for a benchmarking job of one or more tasks, or jobs, for a model to be executed as detailed above. In this illustration, the benchmarking service 123 utilizes an external monitor service.

In this illustration, there are several circles with numbers which are used to illustrate an exemplary flow according to some embodiments. At circle 1, a user device 101 adds or modifies a task to be executed as a part of a job at a monitor service 121A which is coupled to a benchmarking service 123. As before, the user device 101 provides at least one objective for the execution of a job using the added or modified task. In some embodiments, the user device 101 is used to add a trigger to the monitor service 121A to start the benchmarking job and/or to detail what metrics are to be provided to the user device 101.

The monitor service 121A provides the task(s) of the job to the benchmarking service 123 at circle 2.

The benchmarking service 123 retrieves the algorithm/model 129 and training data 127 to be used in the job at circle 3. The location of these items is provided by the task that was added or modified.

The benchmarking service 123 uses the retrieved algorithm/model 129 and training data 127 to generate an execution plan (if one does not exist) according to the at least one objective provided by the user at circle 4. In some embodiments, the retrieved algorithm/model 129 and training data 127 are subjected to training on a plurality of hardware configurations to ascertain run times, accuracy, etc. In other embodiments, training of the retrieved algorithm/model 129 is simulated based on the algorithm/model 129 without subjecting it to actual training. This initial training, or simulation, provides a baseline of what hardware can execute the task and meet the objective(s). If there are no other similar algorithms/models, or other scheduled jobs, the benchmarking service 123 uses the baseline to develop an execution plan that attempts to meet the objective(s).

When an execution plan exists, the benchmarking service 123 uses information about previous execution(s) of the execution plan to determine if the execution plan should be updated. For example, when a previous number of executions of the execution plan do not meet the objective(s), the execution plan is updated to account for the changes. There are several reasons why an execution plan may not meet objectives including changes made to the model and/or training data, lack of availability of batching, etc.

When there are other similar algorithms/models, other scheduled jobs, and/or previous runs, the benchmarking service 123 uses the baseline and takes into account this external information to generate or update the execution plan. For example, the benchmarking service 123 may batch benchmarking jobs with similar hardware and software requirements to run on the same setup as part of an execution plan.

At circle 5, in some embodiments, the generated or updated execution plan is provided, or access to the plan is provided, to the monitor service 121A which enables execution of the execution plan.

At circle 6, model training instance(s) are instantiated and execute the task(s) of the job according to the execution plan. The execution statistics of the execution (such as a result, or during execution) are provided back to at least the monitor service 121A and the benchmarking service 123.

At circle 7, calculated metrics are provided from the monitor service 121A. The metrics are calculated using the execution statistics according to the task definition(s).

While not shown, in some embodiments, when a benchmarking result is worse than a threshold, code changes are automatically rolled back to a previous point that had better benchmarking results. For example, the underlying algorithm/model 129 is rolled back. Note that at least one previous algorithm/model 129 version should be available for this rollback. The threshold is set by the requesting user in most embodiments.

Figure 3:
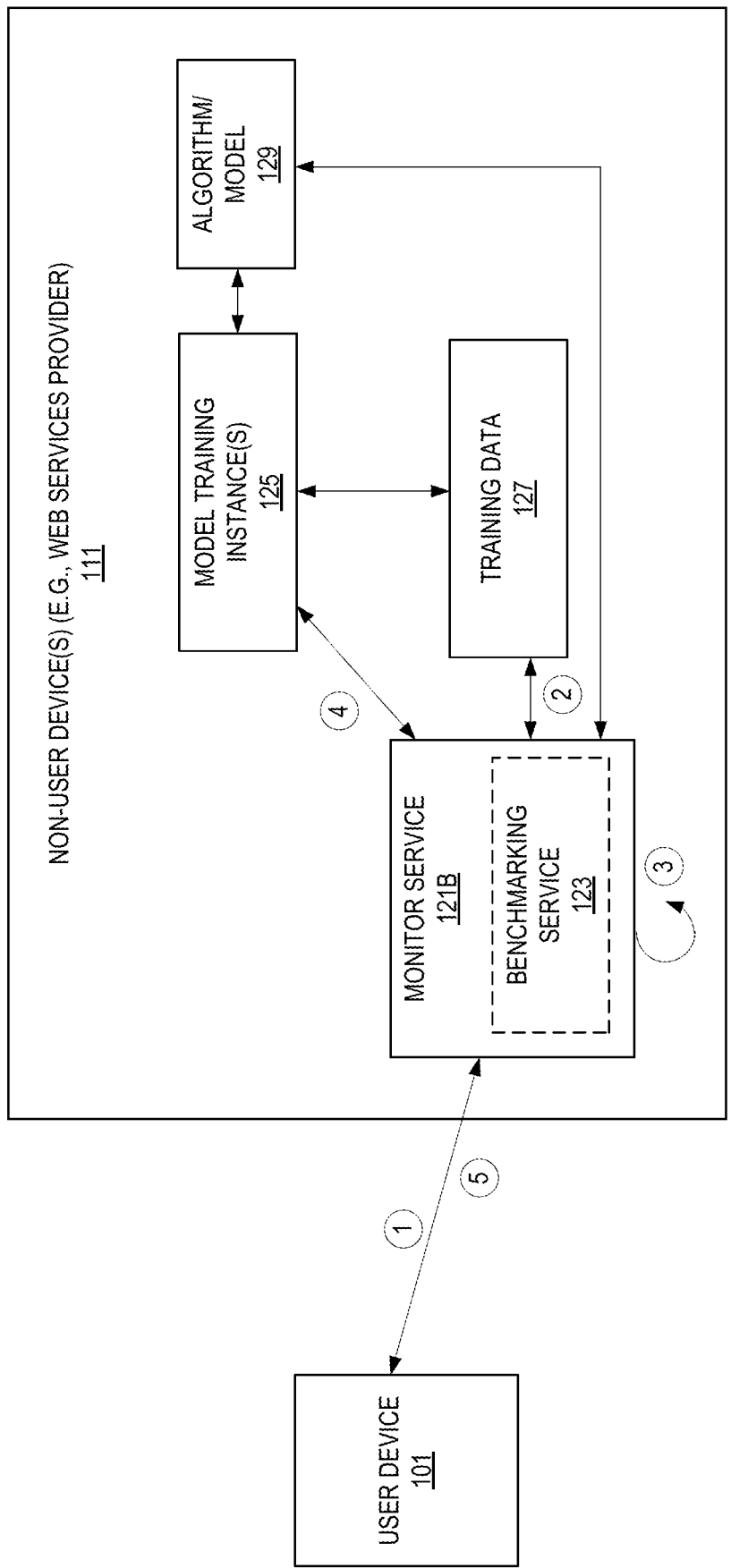
FIG. 3 illustrates embodiments of a system capable of benchmarking machine learning models.

FIG. 3 illustrates embodiments of a system capable of benchmarking machine learning models. A benchmarking service 123 generates an execution plan for a benchmarking job of one or more tasks, or jobs, for a model to be executed as detailed above. In this illustration, the benchmarking service 123 utilizes an external monitor service.

In this illustration, there are several circles with numbers which are used to illustrate an exemplary flow according to some embodiments. At circle 1, a user device 101 adds or modifies a task to be executed as a part of a job to a monitor service 121B which includes a benchmarking service 123. As before, the user device 101 provides at least one objective for the execution of a job using the added or modified task. In some embodiments, the user device 101 is used to add a trigger to the monitor service 121B to start the benchmarking job and/or to detail what metrics are to be provided to the user device 101.

The benchmarking service 123 retrieves the algorithm/model 129 and training data 127 to be used in the job at circle 2. The location of these items is provided by the task that was added or modified.

The benchmarking service 123 uses the retrieved algorithm/model 129 and training data 127 to generate an execution plan (if one does not exist) according to the at least one objective provided by the user at circle 3. In some embodiments, the retrieved algorithm/model 129 and training data 127 are subjected to training on a plurality of hardware configurations to ascertain run times, accuracy, etc. In other embodiments, training of the retrieved algorithm/model 129 is simulated based on the algorithm/model 129 without subjecting it to actual training. This initial training, or simulation, provides a baseline of what hardware can execute the task and meet the objective(s). If there are no other similar algorithms/models, or other scheduled jobs, the benchmarking service 123 uses the baseline to develop an execution plan that attempts to meet the objective(s).

When an execution plan exists, the benchmarking service 123 uses information about previous execution(s) of the execution plan to determine if the execution plan should be updated. For example, when a previous number of executions of the execution plan do not meet the objective(s), the execution plan is updated to account for the changes. There are several reasons that an execution plan may not meet objectives including changes made to the model and/or training data, lack of availability of batching, etc.

When there are other similar algorithms/models, other scheduled jobs, and/or previous runs, the benchmarking service 123 uses the baseline and takes into account this external information to generate or update the execution plan. For example, the benchmarking service 123 may batch benchmarking jobs with similar hardware and software requirements to run on the same setup as part of an execution plan.

At circle 4, model training instance(s) are instantiated and execute the task(s) of the job according to the execution. The execution statistics of the execution (such as a result, or during execution) are provided back to at least the monitor service 121B and the benchmarking service 123.

At circle 5, calculated metrics are provided from the monitor service 121B. The metrics are calculated using the execution statistics according to the task definition(s).

Figure 4:
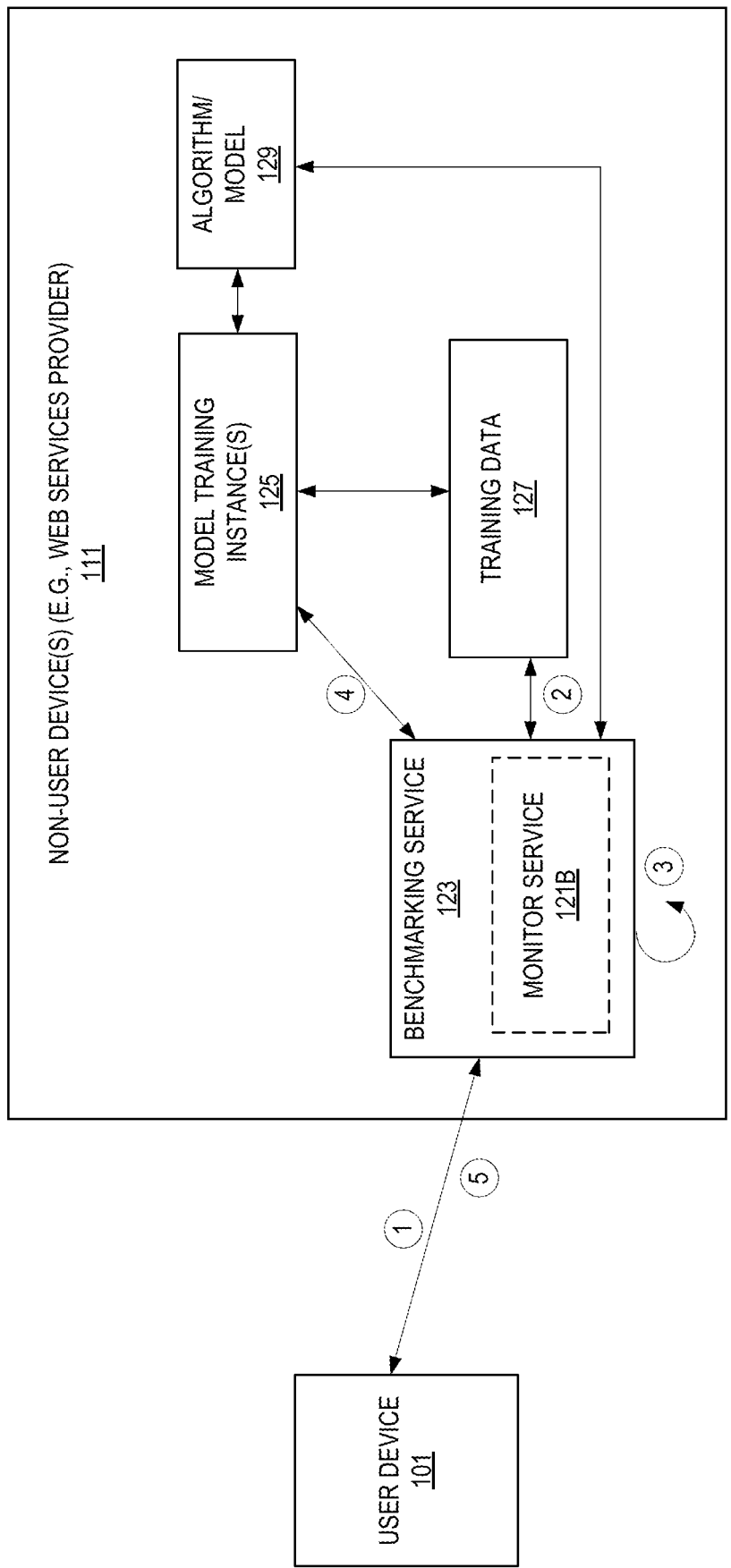
FIG. 4 illustrates embodiments of system capable of benchmarking machine learning models.

FIG. 4 illustrates embodiments of system capable of benchmarking machine learning models. A benchmarking service 123 generates an execution plan for a benchmarking job of one or more tasks, or jobs, for a model to be executed as detailed above. In this illustration, the benchmarking service 123 utilizes an internal monitor service.

In this illustration, there are several circles with numbers which are used to illustrate an exemplary flow according to some embodiments. At circle 1, a user device 101 adds or modifies a task to be executed as a part of a job to a monitor service 121B which includes a benchmarking service 123. As before, the user device 101 provides at least one objective for the execution of a job using the added or modified task. In some embodiments, the user device 101 is used to add a trigger to the monitor service 121B to start the benchmarking job and/or detail what metrics are to be provided to the user device 101.

The benchmarking service 123 retrieves the algorithm/model 129 and training data 127 to be used in the job at circle 2. The location of these items is provided by the task that was added or modified.

The benchmarking service 123 uses the retrieved algorithm/model 129 and training data 127 to generate an execution plan (if one does not exist) according to the at least one objective provided by the user at circle 3. In some embodiments, the retrieved algorithm/model 129 and training data 127 are subjected to training on a plurality of hardware configurations to ascertain run times, accuracy, etc. In other embodiments, training of the retrieved the algorithm/model 129 is simulated based on the algorithm/model 129 without subjecting it to actual training. This initial training, or simulation, provides a baseline of what hardware can execute the task and meet the objective(s). If there are no other similar algorithms/models, or other scheduled jobs, the benchmarking service 123 uses the baseline to develop an execution plan that attempts to meet the objective(s).

When an execution plan exists, the benchmarking service 123 uses information about previous execution(s) of the execution plan to determine if the execution plan should be updated. For example, when a previous number of executions of the execution plan do not meet the objective(s), the execution plan is updated to account for the changes. There are several reasons that an execution plan may not meet objectives including changes made to the model and/or training data, lack of availability of batching, etc.

When there are other similar algorithms/models, other scheduled jobs, and/or previous runs, the benchmarking service 123 uses the baseline and takes into account this external information to generate or update the execution plan. For example, the benchmarking service 123 may batch benchmarking jobs with similar hardware and software requirements to run on the same setup as part of an execution plan.

At circle 4, model training instance(s) are instantiated and execute the task(s) of the job according to the execution. The execution statistics of the execution (such as a result, or during execution) provided back to at least the monitor service 121B and the benchmarking service 123.

At circle 5, calculated metrics are provided from the monitor service 121B. The metrics are calculated using the execution statistics according to the task definition(s).

While not shown, in some embodiments, when a benchmarking result is worse than a threshold, code changes are automatically rolled back to a previous point that had better benchmarking results. For example, the underlying algorithm/model 129 is rolled back. Note that at least one previous algorithm/model 129 version should be available for this rollback. The threshold is set by the requesting user in most embodiments.

Figure 5:
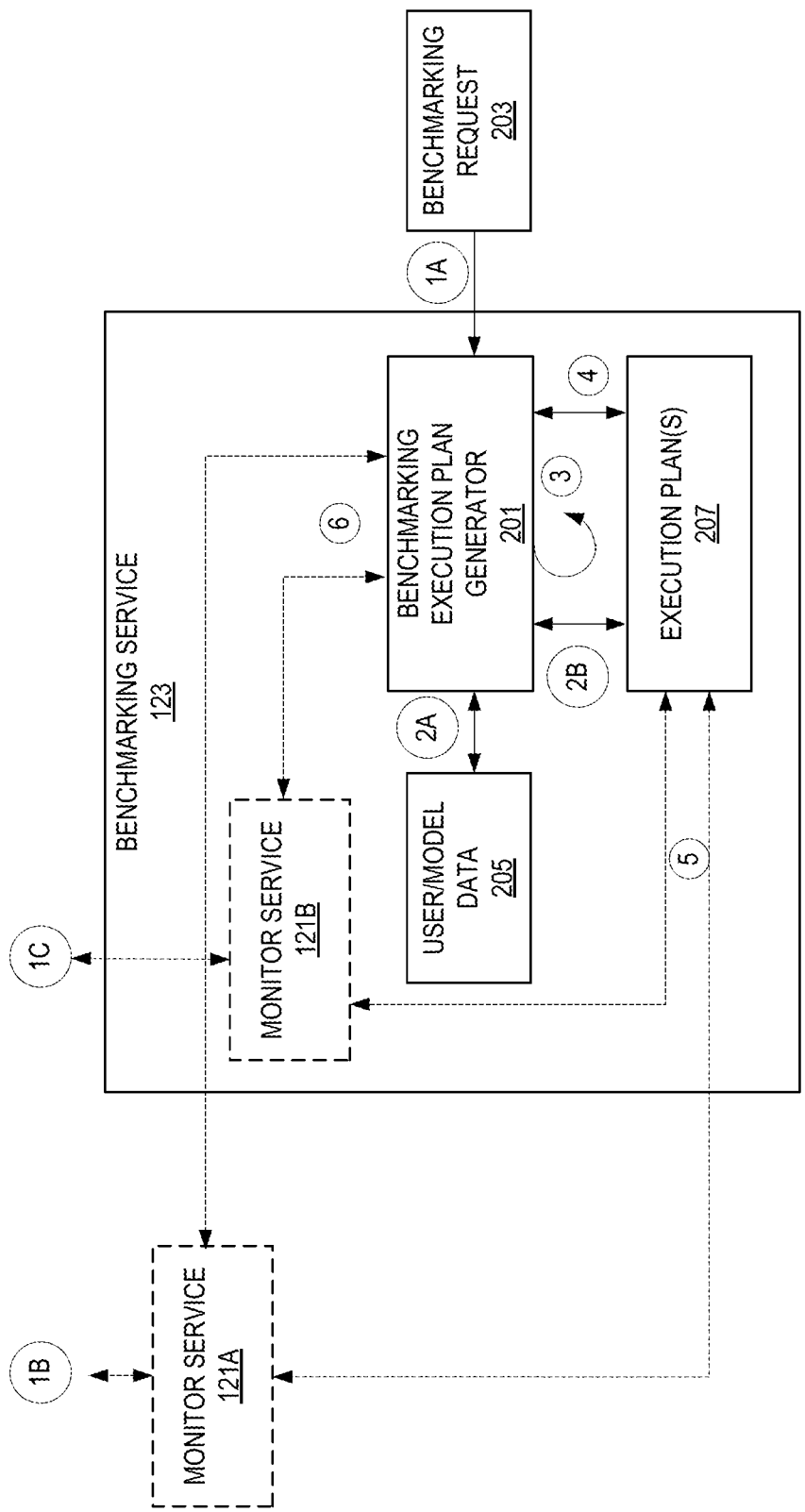
FIG. 5 illustrates embodiments of components of a benchmarking service.

FIG. 5 illustrates embodiments of components of a benchmarking service. As detailed above, the benchmarking service 123 generates an execution plan for a job for at least one task according to a benchmarking request 203 (having a task and/or objective) as detailed above. A benchmarking execution plan generator 201 generates this execution plan based on a plurality of inputs.

User and model data 205 stores information about the particular user (or account) making the benchmarking request 203 such as what rights the user has to storage locations, what hardware resources the user has access to, etc. The user and model data 205 also stores, at least temporarily, information about the model to be benchmarked (including, in some instances, the model and testing data). The user and model data 205 may also store data about other users and their models, rights, etc. that may be used in batching. In some embodiments user and model data 205 includes information about instance usage, past executions, etc.

The benchmarking execution plan generator 201 also has access to an execution plan 207 for the benchmarking job (if created) and, in some embodiments, access to other execution plans 207 that may be used as a basis for generating the execution plan for the benchmarking request 203.

In this illustration, there are several circles with numbers which are used to illustrate an exemplary flow according to some embodiments. At circle 1, a benchmarking request 203 to generate a benchmarking job is received. In some embodiments, at circle 1A, the benchmarking execution plan generator receives a benchmarking job request 203. In some embodiments, at circle 1B, an external monitor service 121A receives a benchmarking job request 203. In some embodiments, at circle 1C, an internal monitor service 121B receives a benchmarking job request 203.

At circle 2, the benchmarking execution plan generator 201 accesses available information used to generate the requested benchmarking job. At 2A, the user and model data 205 is accessed and, at 2B, any previous execution plan 207 is accessed, and, in some embodiments, other execution plan(s) 207 are accessed.

The benchmarking execution plan generator 201 utilizes the available information to generate an execution plan at circle 3. In some embodiments, this execution plan is stored at circle 4.

At circle 5, in some embodiments, the generated execution plan is provided to a monitor service 121A or 121B.

Figure 6:
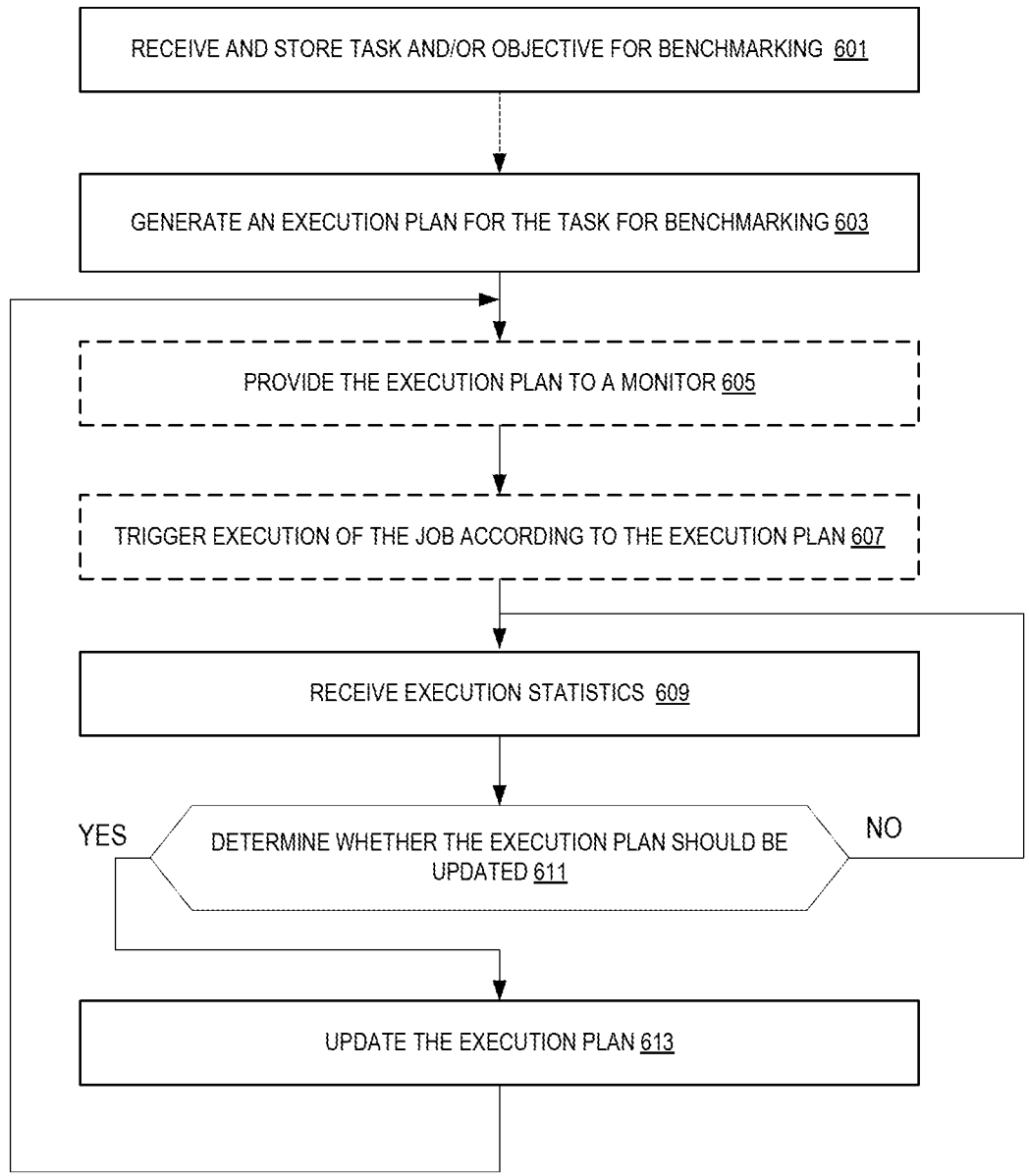
FIG. 6 illustrates embodiments of a method for generating and/or updating an execution plan by a benchmarking service.

FIG. 6 illustrates embodiments of a method for generating and/or updating an execution plan by a benchmarking service. In some embodiments, at 601, a task for benchmarking is received and stored. In some embodiments, a benchmarking request to generate a benchmarking job is received that includes this task. Templates for such a task are described herein.

The benchmarking service generates an execution plan for the job (task) at 603. For example, a benchmarking execution plan generator 201 utilizes information available to it, including but not limited to: hardware available to the user requesting the benchmarking job, available jobs to batch, previous execution of the task to be run as a job, previous execution of similar jobs, etc. in the generation of an execution plan according to the desired objective(s).

An execution plan defines what hardware to run the job on, what statistics to gather, where to store results of the execution of the job, what triggers the plan, etc.

In some embodiments, the algorithm/model and training data of the task of the benchmarking request are subjected to training on a plurality of hardware configurations to ascertain run times, accuracy, etc. In other embodiments, the training of the algorithm/model of the task of the benchmarking request is simulated based on the algorithm/model without subjecting it to actual training. This initial training, or simulation, provides a baseline of what hardware can execute the task and meet the objective(s). If there are no other similar algorithms/models, or other scheduled jobs, the benchmarking service uses the baseline to develop an execution plan that attempts to meet the objectives.

When an execution plan exists, the benchmarking service uses information about previous execution(s) of the execution plan do determine if the execution plan should be updated. For example, when a last number of executions of the execution plan do not meet the objective(s), the execution plan is updated to account for the changes. There are several reasons that an execution plan may not meet objectives including changes made to the model and/or training data, lack of availability of batching, etc.

When there are other similar algorithms/models, other scheduled jobs, and/or previous runs, the benchmarking service uses the baseline and takes into account this external information to generate or update the execution plan. For example, the benchmarking service 123 may batch benchmarking jobs with similar hardware and software requirements to run on the same setup as part of an execution plan.

The generated execution plan is provided to a monitor service at 605 in some embodiments. The monitor service triggers execution of the job according to the execution plan.

In some embodiments, the benchmarking service triggers execution of the job according to the execution plan at 607.

After that execution plan has been executed (the job performed), statistics about the execution are received at 609. In some embodiments, these statistics are collected by the monitor service, as directed by the execution plan. In other embodiments, the statistics are directly received by the benchmarking service.

A determination of whether the execution plan should be updated is made at 611. For example, the determination may be based on determining whether the execution meet the objective(s). In some instances, a threshold number of times of failure to meet objectives is required. In some embodiments, the determination includes input from the user.

If yes, then the execution plan is updated, or other past-actions are performed, at 613 based at least on the statistics received at 609. In some embodiments, at 613, one or more of: the execution plan is updated, code is rolled back, an alarm is generated, a user-specified action is performed, another job run is triggered (using a new plan with the original execution plan maintained so that a comparison can be made), etc.

For example, the execution plan may be updated based on changes to the task (for example, changes to the model or algorithm), availability of resources, or the objectives not being meet as determined from the collected statistics. The update of the execution plan takes into account the same, or similar, inputs as the initiation creation of the execution plan.

For example, in some embodiments, when a benchmarking result is worse than a threshold, code changes are automatically rolled back to a previous point that had better benchmarking results at 613. For example, the underlying algorithm/model 129 is rolled back. Note that at least one previous algorithm/model 129 version should be available for this rollback. The threshold is set by the requesting user in most embodiments.

Figure 7:
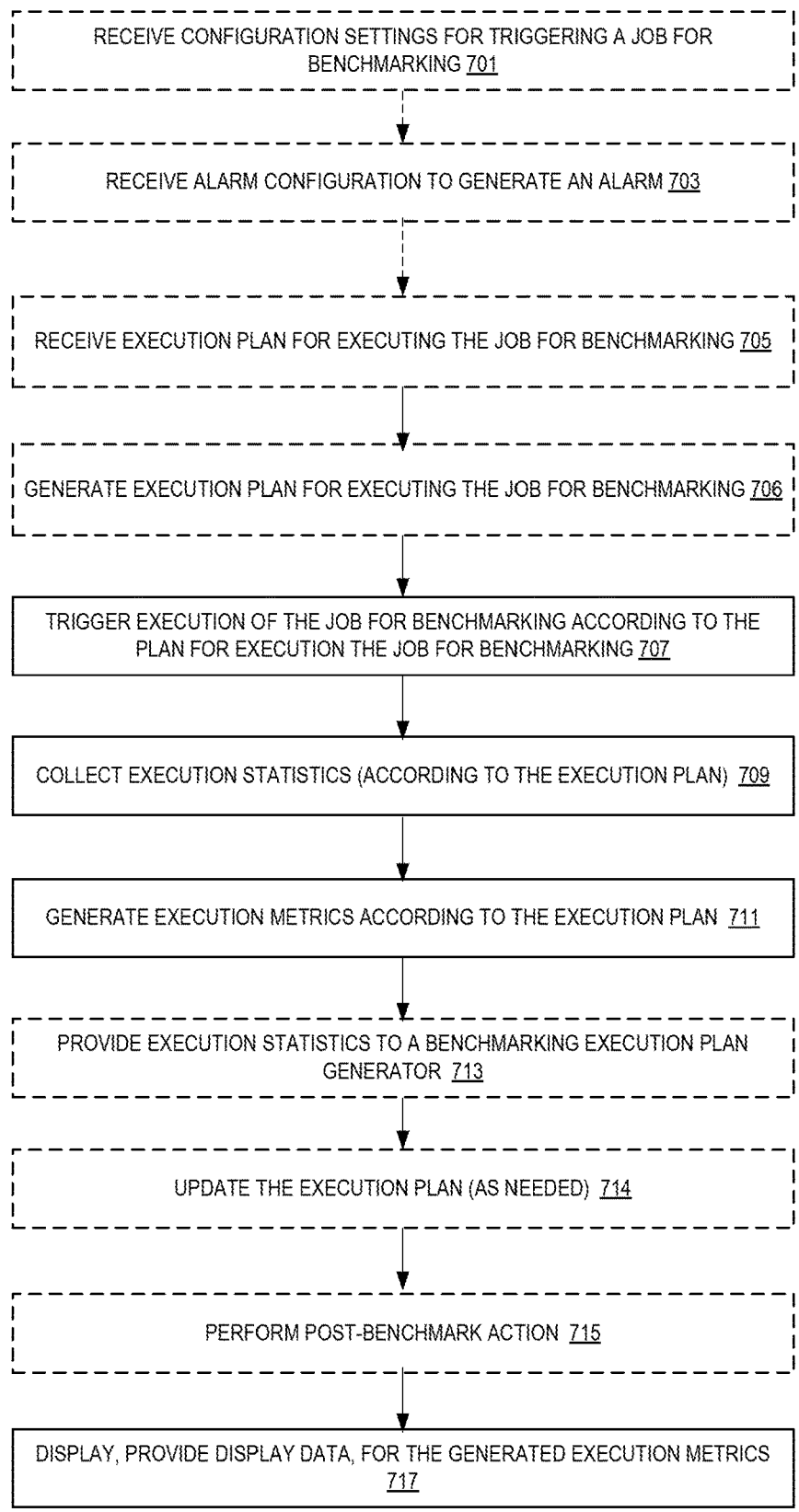
FIG. 7 illustrates embodiments of a method for configuring a monitor service to handle a benchmarking job of an execution plan.

FIG. 7 illustrates embodiments of a method for configuring a monitor service to handle a benchmarking job of an execution plan. The actions detailed are performed by the monitor service.

At 701, configuration settings for triggering a job (task) for benchmarking are received in some embodiments. For example, a user device accesses the monitor service and provides an indication of what should trigger a benchmarking job, such as what time to run the job, what frequency to run the job, etc. The configuration settings typically include the task or job name from the benchmarking request or execution plan. The configuration settings may be included as a part of a task template in some instances.

At 703, in some embodiments, alarm configuration settings are received for the generation of an alarm based on the execution of the benchmarking job. For example, an alarm may be configured to be generated when a benchmarking job does not complete, does not meet an objective, is inconsistent with past results beyond a threshold, etc.

At 705, an execution plan for executing the job (task) for benchmarking is received (if it has not already been received) in some embodiments. At some point later in time, the benchmarking job is triggered and executed according to the execution plan at 707. For example, the monitor instantiates a model training instance.

An execution plan for executing the job (task) for benchmarking is generated in some embodiments at 706. Examples of generating an execution plan have been detailed above. In these embodiments, the benchmarking service is a part of the monitor service.

Execution statistics of the model training instance are collected at 709. In some embodiments, only statistics needed to generate requested execution metrics are collected. The executing entity (container or virtual machine) is directed to send these statistics or is polled for them. Execution statistics may include statistics gathered during execution and final statistics upon completing the job (result statistics).

Execution metrics, according to the task that was benchmarked, are generated at 711. Exemplary metrics have been detailed.

At 713, the collected execution statistics of the model training instance are provided to a benchmarking service to be used in potentially updating the execution plan in some embodiments.

An execution plan for executing the job (task) for benchmarking is updated in some embodiments at 714. Examples of updating an execution plan have been detailed above.

At 715, a post-benchmarking action is performed as detailed in 613. For example, an alarm is generated as needed, in some embodiments. In some embodiments, code changes are automatically rolled back to a previous point that had better benchmarking results.

At any point in time, a user may request display data for the generated execution metrics (and in some embodiments, the collected statistics) and the execution metrics/statistics are provided for display at 717.

FIG. 8 illustrates embodiments an exemplary task template and an exemplary task. Typically, a task according to task template 801 is a part of a benchmarking request. In the exemplary task template 801 there are several fields that are provided by a user. While several are shown, not all are needed depending upon the embodiments. However, each task includes a command to execute 811 and a task name 803. The command to execute 811 includes a path to a model and what data to use. The command to execute 811 may also include the number of processors to use, a logging interval, and a number of epochs to evaluate.

The task template 801 may also include patterns 805, metrics 807, computational methods for the metrics 809, and a specific indication of hardware to use 813.

An exemplary task 821 is shown according to the task template 801.

Figure 9:
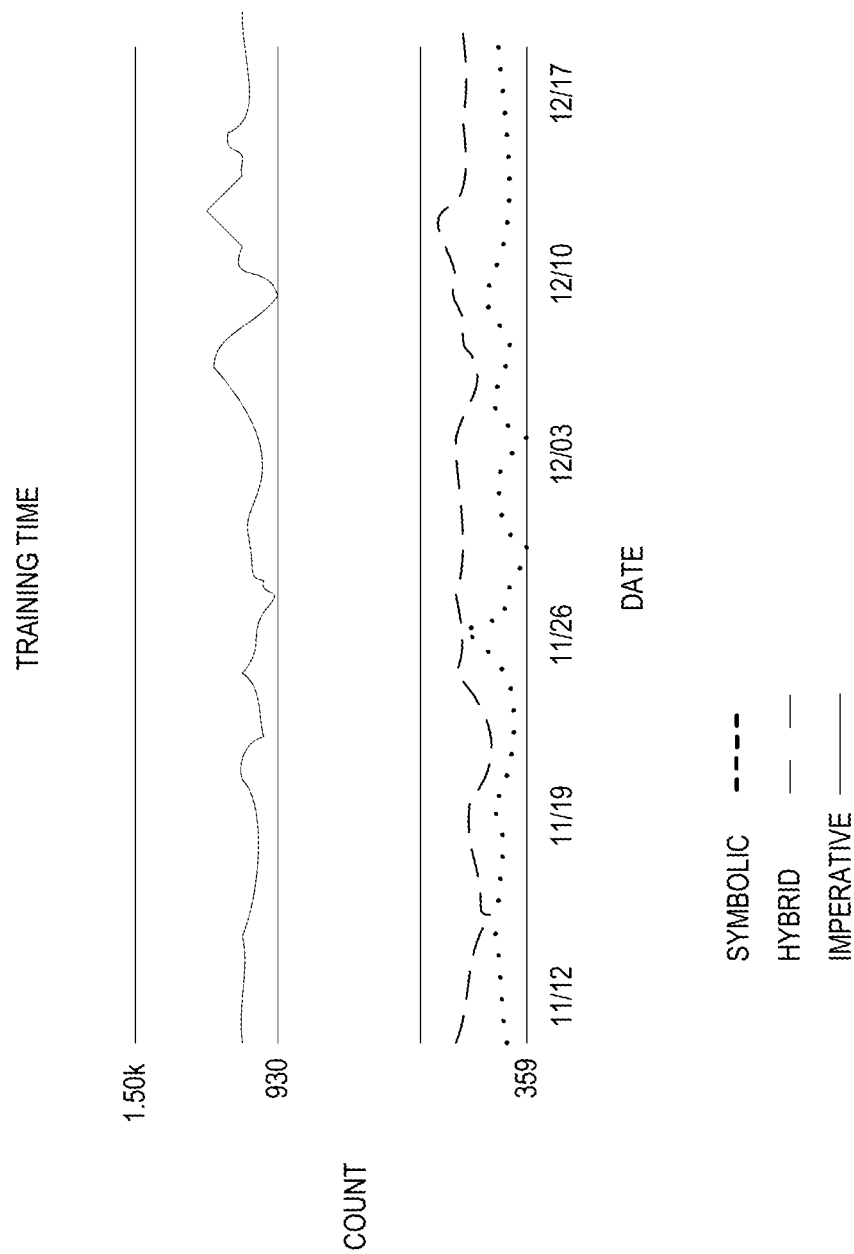
FIGS. 9-10 illustrate exemplary graphs provided by a monitor service showing execution time and speed, respectively, of a task executed according to a benchmarking execution plan.
Figure 10:
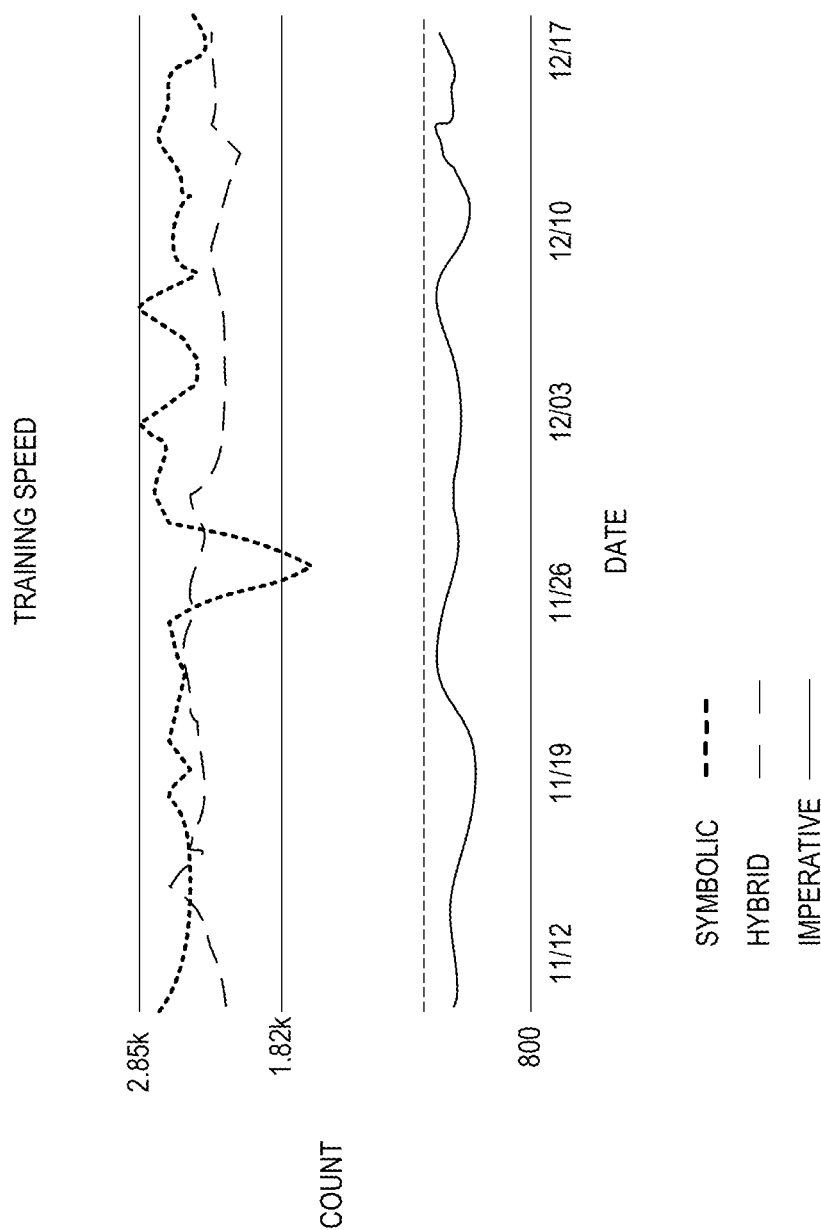

FIGS. 9-10 illustrate exemplary graphs provided by a monitor service showing execution time and speed, respectively, of a task executed according to a benchmarking execution plan. Note that spikes and dips may help a user identify when a problem arose in the underlying model training. For example, a code change of a particular data may be problematic and need to be adjusted. In some embodiments, spikes or dips that are beyond a threshold cause an alarm to be generated.

Figure 11:
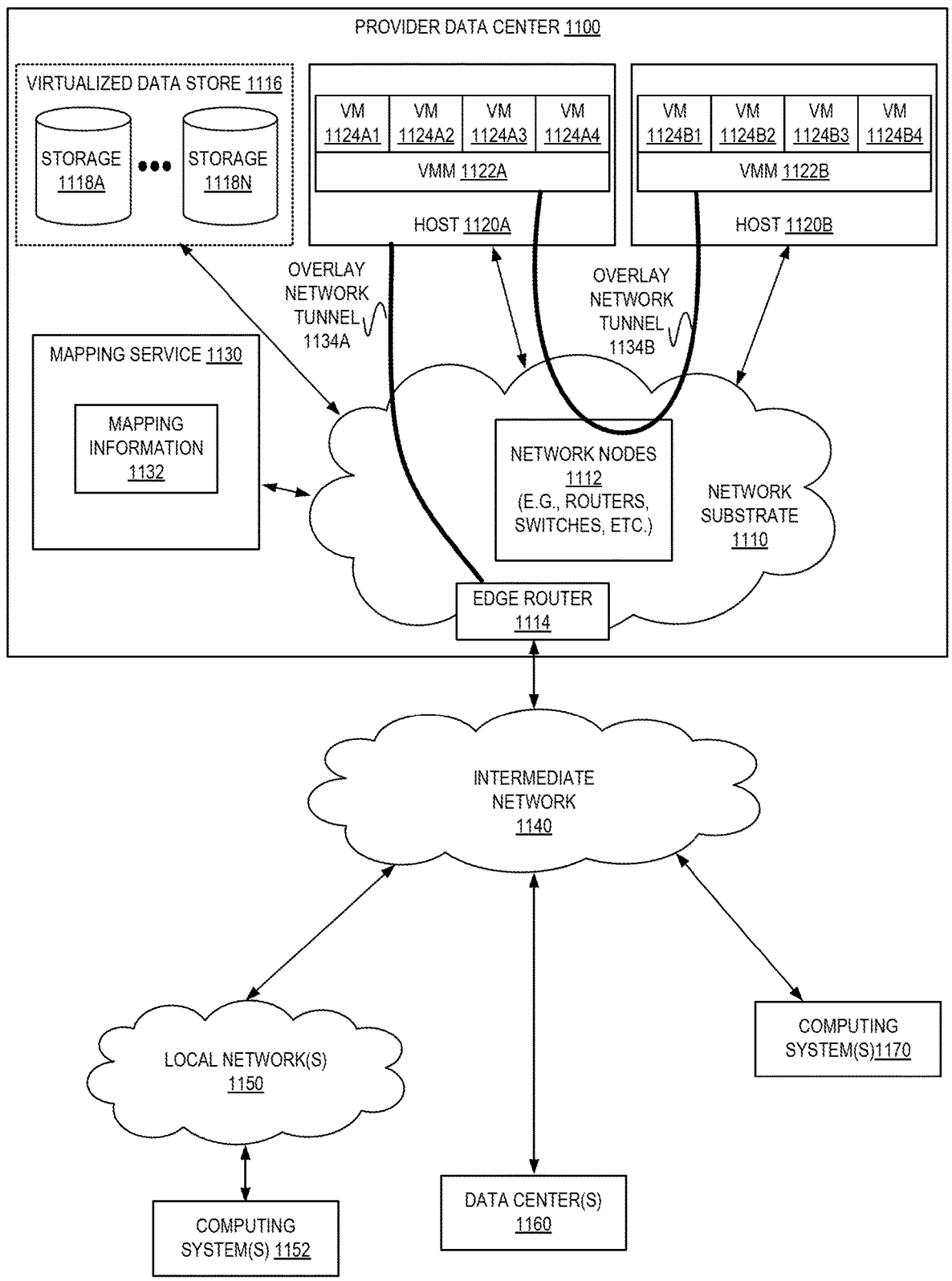
FIG. 11 illustrates an example data center that implements an overlay network on a network substrate using IP tunneling technology according to some embodiments.

FIG. 11 illustrates an example data center that implements an overlay network on a network substrate using IP tunneling technology, according to some embodiments. A provider data center 1100 may include a network substrate that includes networking nodes 1112 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1110 using tunnels. The IP tunneling technology may provide a mapping and encapsulating system for creating an overlay network on a network (e.g., a local network in data center 1100 of FIG. 11) and may provide a separate namespace for the overlay layer (the public IP addresses) and the network substrate 1110 layer (the local IP addresses). Packets in the overlay layer may be checked against a mapping directory (e.g., provided by mapping service 1130) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1130) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 11, an example overlay network tunnel 1134A from a virtual machine (VM) 1124A (of VMs 1124A1-1124A4, via VMM 1122A) on host 1120A to a device on the intermediate network 1150 and an example overlay network tunnel 1134B between a VM 1124A (of VMs 1124A1-1124A4, via VMM 1122A) on host 1120A and a VM 1124B (of VMs 1124B1-1124B4, via VMM 1122B) on host 1120B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 11, at least some networks in which embodiments may be implemented may include hardware virtualization technology that enables multiple operating systems to run concurrently on a host computer (e.g., hosts 1120A and 1120B of FIG. 11), i.e. as virtual machines (VMs) 1124 on the hosts 1120. The VMs 1124 may, for example, be executed in slots on the hosts 1120 that are rented or leased to customers of a network provider. A hypervisor, or virtual machine monitor (VMM) 1122, on a host 1120 presents the VMs 1124 on the host with a virtual platform and monitors the execution of the VMs 1124. Each VM 1124 may be provided with one or more local IP addresses; the VMM 1122 on a host 1120 may be aware of the local IP addresses of the VMs 1124 on the host. A mapping service 1130 may be aware of (e.g., via stored mapping information 1132) network IP prefixes and IP addresses of routers or other devices serving IP addresses on the local network. This includes the IP addresses of the VMMs 1122 serving multiple VMs 1124. The mapping service 1130 may be centralized, for example on a server system, or alternatively may be distributed among two or more server systems or other devices on the network. A network may, for example, use the mapping service technology and IP tunneling technology to, for example, route data packets between VMs 1124 on different hosts 1120 within the data center 1100 network; note that an interior gateway protocol (IGP) may be used to exchange routing information within such a local network.

In addition, a network such as the provider data center 1100 network (which is sometimes referred to as an autonomous system (AS)) may use the mapping service technology, IP tunneling technology, and routing service technology to route packets from the VMs 1124 to Internet destinations, and from Internet sources to the VMs 1124. Note that an external gateway protocol (EGP) or border gateway protocol (BGP) is typically used for Internet routing between sources and destinations on the Internet. FIG. 11 shows an example provider data center 1100 implementing a network that provides resource virtualization technology and that provides full Internet access via edge router(s) 1114 that connect to Internet transit providers, according to some embodiments. The provider data center 1100 may, for example, provide customers the ability to implement virtual computing systems (VMs 1124) via a hardware virtualization service and the ability to implement virtualized data stores 1116 on storage resources 1118A-1118N via a storage virtualization service.

The data center 1100 network may implement IP tunneling technology, mapping service technology, and a routing service technology to route traffic to and from virtualized resources, for example to route packets from the VMs 1124 on hosts 1120 in data center 1100 to Internet destinations, and from Internet sources to the VMs 1124. Internet sources and destinations may, for example, include computing systems 1170 connected to the intermediate network 1140 and computing systems 1152 connected to local networks 1150 that connect to the intermediate network 1140 (e.g., via edge router(s) 1114 that connect the network 1150 to Internet transit providers). The provider data center 1100 network may also route packets between resources in data center 1100, for example from a VM 1124 on a host 1120 in data center 1100 to other VMs 1124 on the same host or on other hosts 1120 in data center 1100.

A service provider that provides data center 1100 may also provide additional data center(s) 1160 that include hardware virtualization technology similar to data center 1100 and that may also be connected to intermediate network 1140. Packets may be forwarded from data center 1100 to other data centers 1160, for example from a VM 1124 on a host 1120 in data center 1100 to another VM on another host in another, similar data center 1160, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1118A-1118N, as virtualized resources to customers of a network provider in a similar manner.

Figure 12:
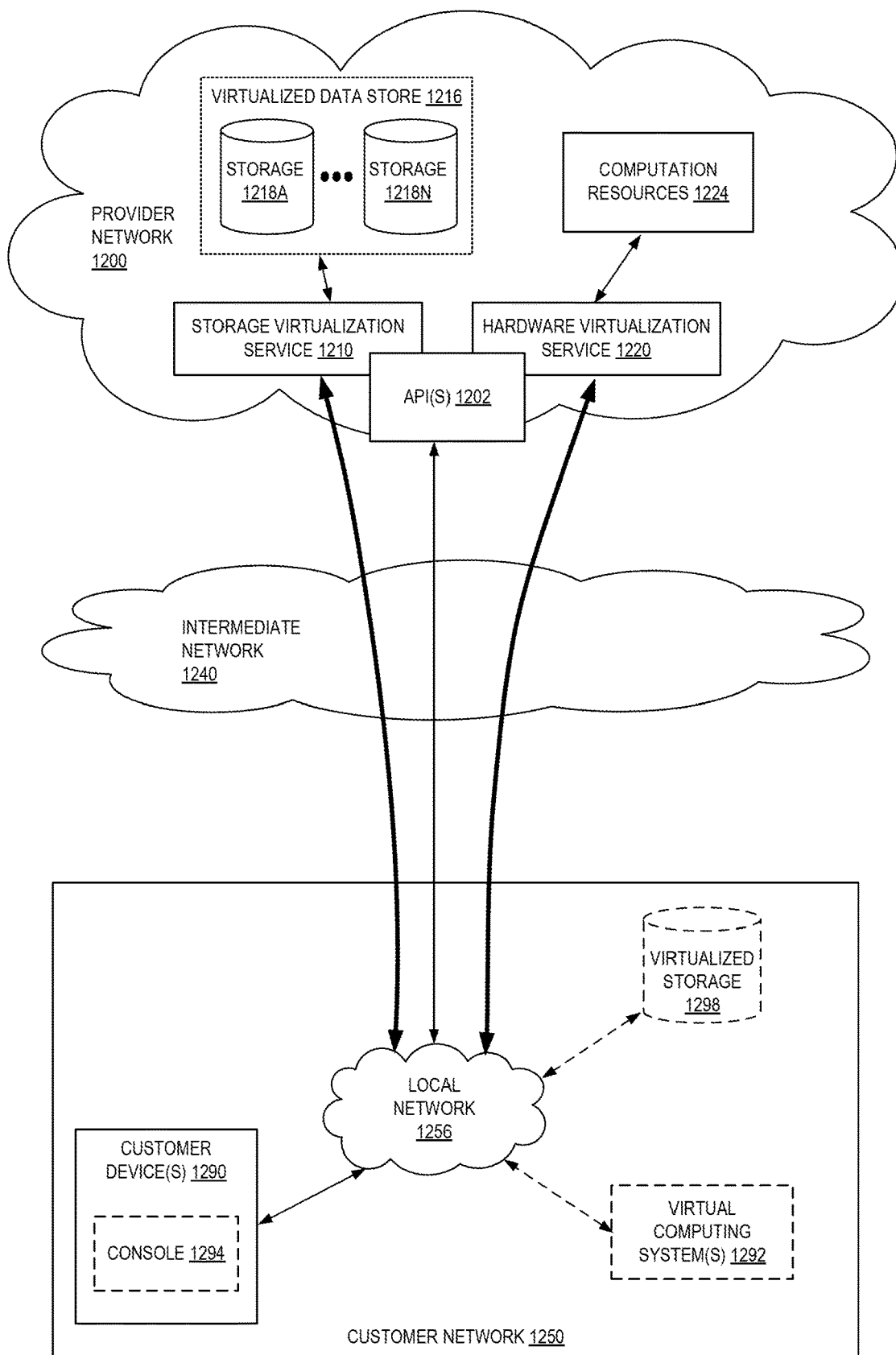
FIG. 12 is a block diagram of an example provider network that provides a storage virtualization service and a hardware virtualization service to customers according to some embodiments.

FIG. 12 is a block diagram of an example provider network that provides a storage virtualization service and a hardware virtualization service to customers, according to some embodiments. Hardware virtualization service 1220 provides multiple computation resources 1224 (e.g., VMs) to customers. The computation resources 1224 may, for example, be rented or leased to customers of the provider network 1200 (e.g., to a customer that implements customer network 1250). Each computation resource 1224 may be provided with one or more local IP addresses. Provider network 1200 may be configured to route packets from the local IP addresses of the computation resources 1224 to public Internet destinations, and from public Internet sources to the local IP addresses of computation resources 1224.

Provider network 1200 may provide a customer network 1250, for example coupled to intermediate network 1240 via local network 1256, the ability to implement virtual computing systems 1292 via hardware virtualization service 1220 coupled to intermediate network 1240 and to provider network 1200. In some embodiments, hardware virtualization service 1220 may provide one or more APIs 1202, for example a web services interface, via which a customer network 1250 may access functionality provided by the hardware virtualization service 1220, for example via a console 1294 (e.g., a web-based application, standalone application, mobile application, etc.). In some embodiments, at the provider network 1200, each virtual computing system 1292 at customer network 1250 may correspond to a computation resource 1224 that is leased, rented, or otherwise provided to customer network 1250.

From an instance of a virtual computing system 1292 and/or another customer device 1290 (e.g., via console 1294), the customer may access the functionality of storage virtualization service 1210, for example via one or more APIs 1202, to access data from and store data to storage resources 1218A-1218N of a virtual data store 1216 provided by the provider network 1200. In some embodiments, a virtualized data store gateway (not shown) may be provided at the customer network 1250 that may locally cache at least some data, for example frequently accessed or critical data, and that may communicate with virtualized data store service 1210 via one or more communications channels to upload new or modified data from a local cache so that the primary store of data (virtualized data store 1216) is maintained. In some embodiments, a user, via a virtual computing system 1292 and/or on another customer device 1290, may mount and access virtual data store 1216 volumes, which appear to the user as local virtualized storage 1298.

While not shown in FIG. 12, the virtualization service(s) may also be accessed from resource instances within the provider network 1200 via API(s) 1202. For example, a customer, appliance service provider, or other entity may access a virtualization service from within a respective virtual network on the provider network 1200 via an API 1202 to request allocation of one or more resource instances within the virtual network or within another virtual network.

Figure 13:
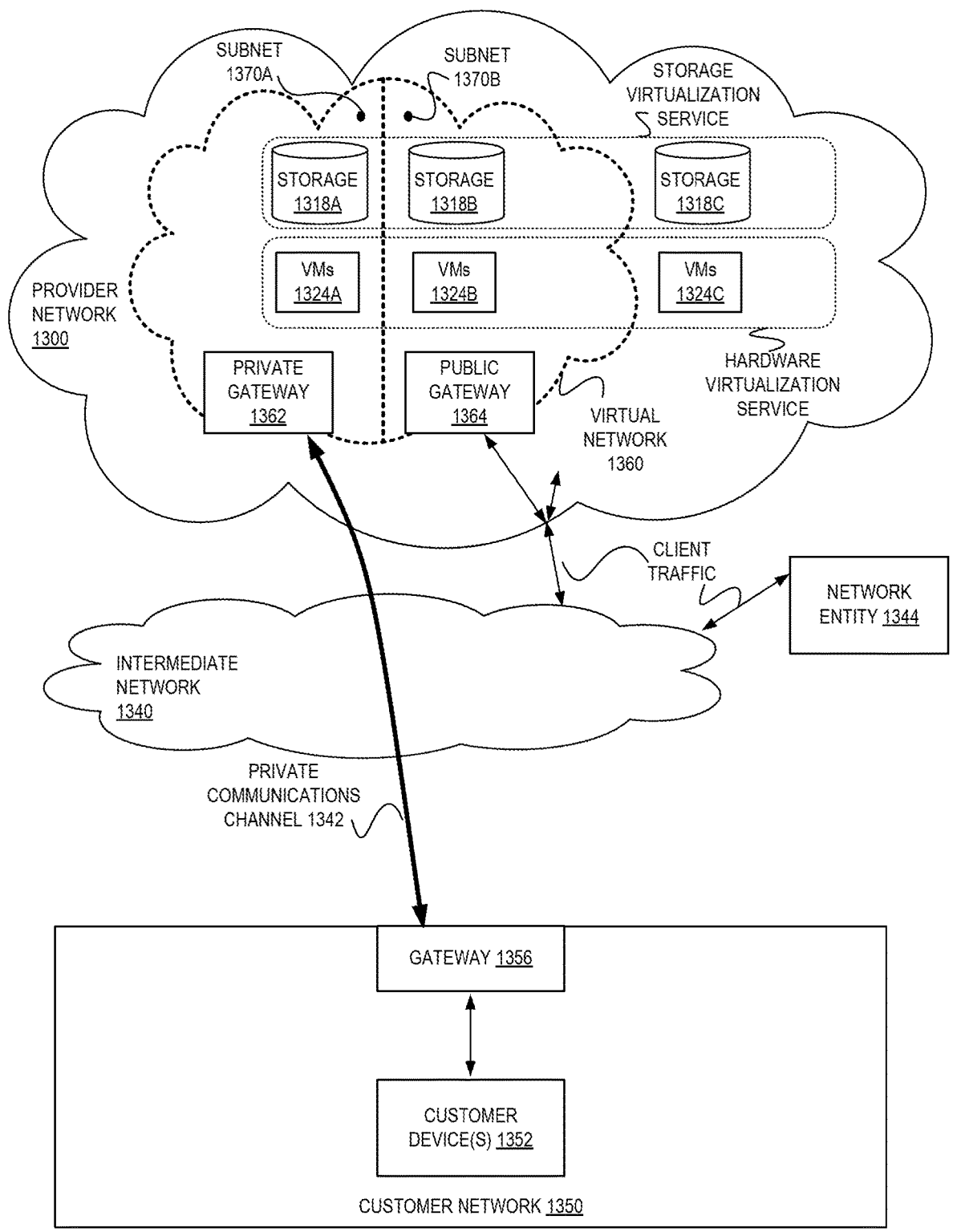
FIG. 13 illustrates an example provider network that provides virtual networks on the provider network to at least some customers according to some embodiments.

FIG. 13 illustrates an example provider network that provides virtual networks on the provider network to at least some customers, according to some embodiments. A customer's virtual network 1360 on a provider network 1300, for example, enables a customer to connect their existing infrastructure (e.g., one or more customer devices 1352) on customer network 1350 to a set of logically isolated resource instances (e.g., VMs 1324A and 1324B and storage 1318A and 1318B), and to extend management capabilities such as security services, firewalls, and intrusion detection systems to include their resource instances.

A customer's virtual network 1360 may be connected to a customer network 1350 via a private communications channel 1342. A private communications channel 1342 may, for example, be a tunnel implemented according to a network tunneling technology or some other technology over an intermediate network 1340. The intermediate network may, for example, be a shared network or a public network such as the Internet. Alternatively, a private communications channel 1342 may be implemented over a direct, dedicated connection between virtual network 1360 and customer network 1350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a customer network.

To establish a virtual network 1360 for a customer on provider network 1300, one or more resource instances (e.g., VMs 1324A and 1324B and storage 1318A and 1318B) may be allocated to the virtual network 1360. Note that other resource instances (e.g., storage 1318C and VMs 1324C) may remain available on the provider network 1300 for other customer usage. A range of public IP addresses may also be allocated to the virtual network 1360. In addition, one or more networking nodes (e.g., routers, switches, etc.) of the provider network 1300 may be allocated to the virtual network 1360. A private communications channel 1342 may be established between a private gateway 1362 at virtual network 1360 and a gateway 1356 at customer network 1350.

In some embodiments, in addition to, or instead of, a private gateway 1362, virtual network 1360 may include a public gateway 1364 that enables resources within virtual network 1360 to communicate directly with entities (e.g., network entity 1344) via intermediate network 1340, and vice versa, instead of or in addition to via private communications channel 1342.

Virtual network 1360 may be, but is not necessarily, subdivided into two or more subnetworks, or subnets, 1370. For example, in implementations that include both a private gateway 1362 and a public gateway 1364, a virtual network 1360 may be subdivided into a subnet 1370A that includes resources (VMs 1324A and storage 1318A, in this example) reachable through private gateway 1362, and a subnet 1370B that includes resources (VMs 1324B and storage 1318B, in this example) reachable through public gateway 1364.

The customer may assign particular customer public IP addresses to particular resource instances in virtual network 1360. A network entity 1344 on intermediate network 1340 may then send traffic to a public IP address published by the customer; the traffic is routed, by the provider network 1300, to the associated resource instance. Return traffic from the resource instance is routed, by the provider network 1300, back to the network entity 1344 over intermediate network 1340. Note that routing traffic between a resource instance and a network entity 1344 may require network address translation to translate between the public IP address and the local IP address of the resource instance.

Some embodiments may allow a customer to remap public IP addresses in a customer's virtual network 1360 as illustrated in FIG. 13 to devices on the customer's external network 1350. When a packet is received (e.g., from network entity 1344), the network 1300 may determine that the destination IP address indicated by the packet has been remapped to an endpoint on external network 1350 and handle routing of the packet to the respective endpoint, either via private communications channel 1342 or via the intermediate network 1340. Response traffic may be routed from the endpoint to the network entity 1344 through the provider network 1300, or alternatively may be directly routed to the network entity 1344 by the customer network 1350. From the perspective of the network entity 1344, it appears as if the network entity 1344 is communicating with the public IP address of the customer on the provider network 1300. However, the network entity 1344 has actually communicated with the endpoint on customer network 1350.

While FIG. 13 shows network entity 1344 on intermediate network 1340 and external to provider network 1300, a network entity may be an entity on provider network 1300. For example, one of the resource instances provided by provider network 1300 may be a network entity that sends traffic to a public IP address published by the customer.

Figure 14:
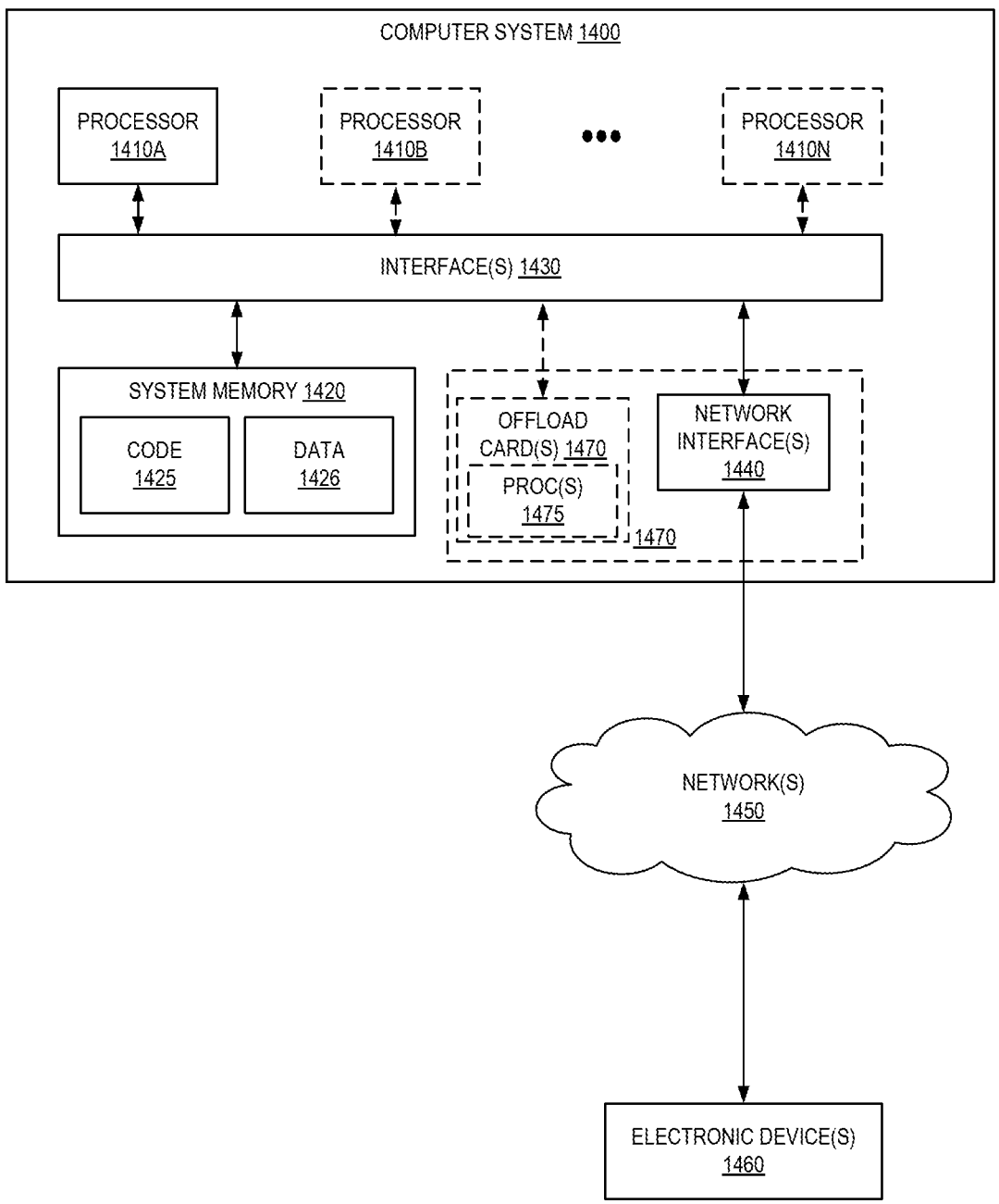
FIG. 14 is a block diagram illustrating an example computer system that may be used in some embodiments.

In some embodiments, a system that implements a portion or all of the techniques for benchmarking as described herein may include a general-purpose computer system that includes or is configured to access one or more computer-accessible media, such as computer system 1400 illustrated in FIG. 14. In the illustrated embodiment, computer system 1400 includes one or more processors 1410 coupled to a system memory 1420 via an input/output (I/O) interface 1430. Computer system 1400 further includes a network interface 1440 coupled to I/O interface 1430. While FIG. 14 shows computer system 1400 as a single computing device, in various embodiments a computer system 1400 may include one computing device or any number of computing devices configured to work together as a single computer system 1400.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1410 may commonly, but not necessarily, implement the same ISA.

System memory 1420 may store instructions and data accessible by processor(s) 1410. In various embodiments, system memory 1420 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1420 as code 1425 and data 1426.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1450, such as other computer systems or devices as illustrated in FIG. 1, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1400 includes one or more offload cards 1470 (including one or more processors 1475, and possibly including the one or more network interfaces 1440) that are connected using an I/O interface 1430 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1400 may act as a host electronic device (e.g., operating as part of a hardware virtualization service) that hosts compute instances, and the one or more offload cards 1470 execute a virtualization manager that can manage compute instances that execute on the host electronic device. As an example, in some embodiments the offload card(s) 1470 can perform compute instance management operations such as pausing and/or un-pausing compute instances, launching and/or terminating compute instances, performing memory transfer/copying operations, etc. These management operations may, in some embodiments, be performed by the offload card(s) 1470 in coordination with a hypervisor (e.g., upon a request from a hypervisor) that is executed by the other processors 1410A-1410N of the computer system 1400. However, in some embodiments the virtualization manager implemented by the offload card(s) 1470 can accommodate requests from other entities, and may not coordinate with (or service) any hypervisor.

In some embodiments, system memory 1420 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Figure 15:
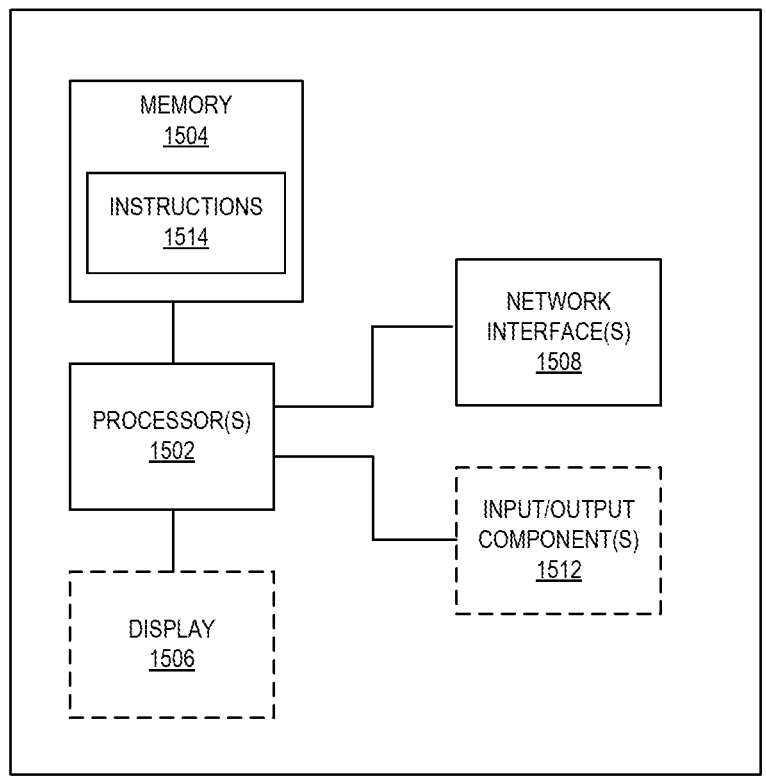
FIG. 15 illustrates a logical arrangement of a set of general components of an exemplary computing device that can be utilized in accordance with various embodiments.

FIG. 15 illustrates a logical arrangement of a set of general components of an example computing device 1500 such as non-user device(s) 111, etc. Generally, a computing device 1500 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1502 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1504) to store code (e.g., instructions 1514) and/or data, and a set of one or more wired or wireless network interfaces 1508 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1504) of a given electronic device typically stores code (e.g., instructions 1514) for execution on the set of one or more processors 1502 of that electronic device. One or more parts of various embodiments may be implemented using different combinations of software, firmware, and/or hardware.

A computing device 1500 can include some type of display element 1506, such as a touch screen or liquid crystal display (LCD), although many devices such as portable media players might convey information via other means, such as through audio speakers, and other types of devices such as server end stations may not have a display element 1506 at all. As discussed, some computing devices used in some embodiments include at least one input and/or output component(s) 1512 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 16:
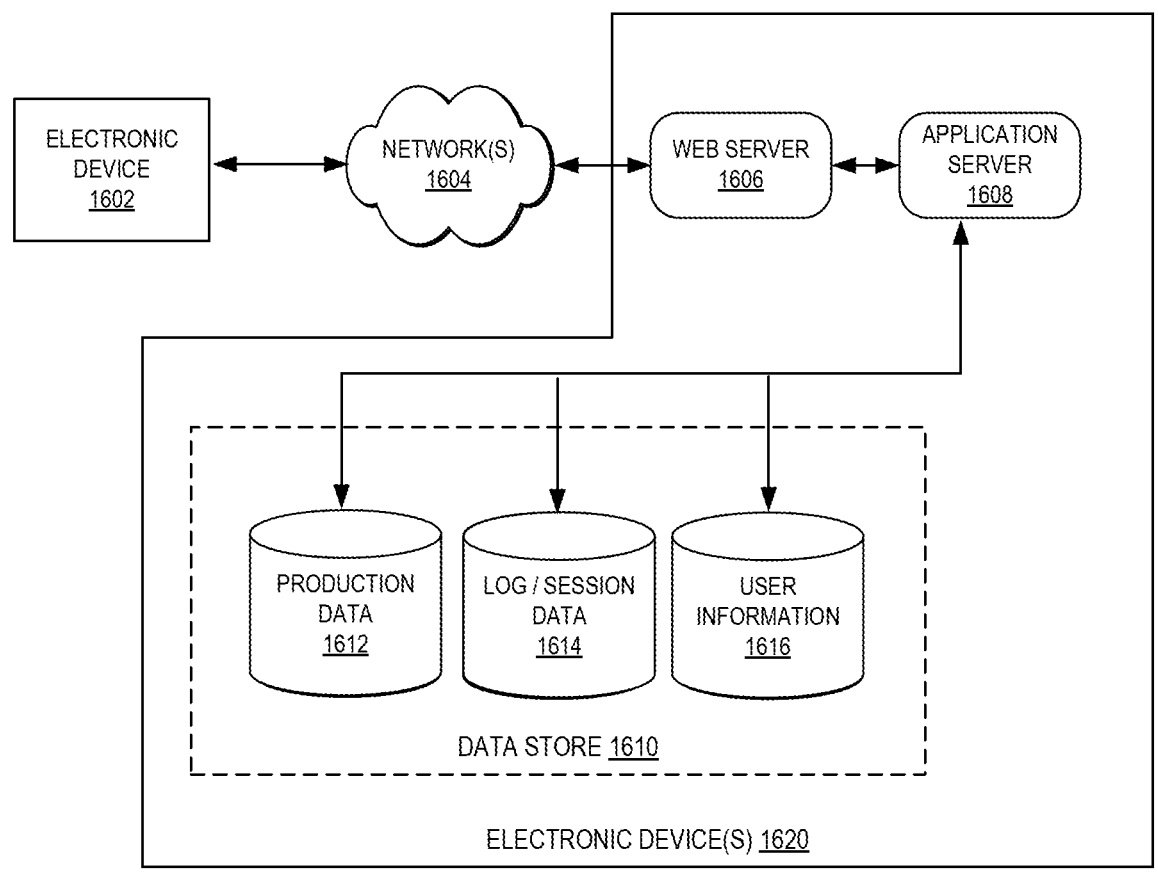
FIG. 16 illustrates an example of an environment for implementing aspects in accordance with various embodiments.

As discussed, different approaches can be implemented in various environments in accordance with the described embodiments. For example, FIG. 16 illustrates an example of an environment 1600 for implementing aspects in accordance with various embodiments. For example, in some embodiments benchmarking requests are HyperText Transfer Protocol (HTTP) requests that are received by a web server (e.g., web server 1606), and the users, via electronic devices, may interact with the provider network via a web portal provided via the web server 1606 and application server 1608. As will be appreciated, although a web-based environment is used for purposes of explanation, different environments may be used, as appropriate, to implement various embodiments. The system includes an electronic client device 1602, which may also be referred to as a client device and can be any appropriate device operable to send and receive requests, messages or information over an appropriate network 1604 and convey information back to a user of the device 1602. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1604 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1604 includes the Internet, as the environment includes a web server 1606 for receiving requests and serving content in response thereto, although for other networks an alternative device serving a similar purpose could be used, as would be apparent to one of ordinary skill in the art.

The illustrative environment includes at least one application server 1608 and a data store 1610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1608 can include any appropriate hardware and software for integrating with the data store 1610 as needed to execute aspects of one or more applications for the client device 1602 and handling a majority of the data access and business logic for an application. The application server 1608 provides access control services in cooperation with the data store 1610 and is able to generate content such as text, graphics, audio, video, etc., to be transferred to the client device 1602, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1602 and the application server 1608, can be handled by the web server 1606. It should be understood that the web server 1606 and application server 1608 are not required and are merely example components, as structured code discussed herein can be executed on any appropriate device or host machine as discussed elsewhere herein.

The data store 1610 can include several separate data tables, databases, or other data storage mechanisms and media for storing data relating to a particular aspect. For example, the data store illustrated includes mechanisms for storing production data 1612 and user information 1616, which can be used to serve content for the production side. The data store 1610 also is shown to include a mechanism for storing log or session data 1614. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update, or otherwise process data in response thereto. In one example, a user might submit a search request for a certain type of item. In this case, the data store 1610 might access the user information 1616 to verify the identity of the user and can access a production data 1612 to obtain information about items of that type. The information can then be returned to the user, such as in a listing of results on a web page that the user is able to view via a browser on the user device 1602. Information for a particular item of interest can be viewed in a dedicated page or window of the browser.

The web server 1606, application server 1608, and/or data store 1610 may be implemented by one or more electronic devices 1620, which can also be referred to as electronic server devices or server end stations, and may or may not be located in different geographic locations. Each of the one or more electronic devices 1620 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the environment 1600 in FIG. 16 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C#, or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to generate an execution plan for a benchmarking job of at least one training or inference task for an identified machine learning model, the request including at least one objective for the benchmarking job;
   generating the execution plan for benchmarking job the at least one training or inference task, the execution plan corresponding to a machine learning model based on the identified machine learning model, identified training data, and the at least one objective for the benchmarking job;
   providing the generated execution plan to a monitor service that is to receive statistics about an execution of the execution plan;
   receiving execution statistics about the execution of the at least one training or inference task performed by the machine learning model as a part of the benchmarking job according to the execution plan from the monitor service; and
   updating the execution plan based at least in part on the received execution statistics about the execution of the at least one training or inference task.

2. The computer-implemented method of claim 1, further comprising:
   triggering execution of the execution plan by the monitor service.

3. The computer-implemented method of claim 1, wherein the generating of the execution plan is further based on at least one of hardware available to a user requesting the benchmarking job, available jobs to batch with the task, previous execution of the task to be run as a job, and previous execution of similar jobs.

4. A computer-implemented method comprising:
generating an execution plan for a benchmarking job of at least one training or inference task corresponding to a machine learning model based on an identified machine learning model, identified training data, and at least one objective for the benchmarking job;
receiving execution statistics about the execution of the at least one training or inference task performed by the machine learning model as a part of the benchmarking job according to the execution plan; and
updating the execution plan based at least in part on the received execution statistics of the at least one training or inference task.

5. The computer-implemented method of claim 4, further comprising:
triggering execution of the execution plan by a monitor service.

6. The computer-implemented method of claim 4, wherein the generating of the execution plan is further based on at least one of hardware available to a user requesting the benchmarking job, available jobs to batch with the task, previous execution of the task to be run as a job, and previous execution of similar jobs.

7. The computer-implemented method of claim 4, wherein the generating of the execution plan includes simulating the training of a model of the task to determine what hardware is capable of executing the task and meet the objective.

8. The computer-implemented method of claim 4, wherein the generating of the execution plan includes executing the training of a model of the task to determine what hardware is capable of executing the task and meet the objective.

9. The computer-implemented method of claim 4, wherein the execution of the task as a part of the benchmarking job according to the execution plan occurs in a virtual machine.

10. The computer-implemented method of claim 4, wherein the execution of the task as a part of the benchmarking job according to the execution plan occurs in a container.

11. The computer-implemented method of claim 4, wherein the objective is at least one of: a shortest possible time to complete the task, a minimum hardware usage possible to complete the task, and accuracy of the machine learning model.

12. The computer-implemented method of claim 4, wherein the generated execution plan is a batch that includes other jobs to be executed on the same hardware.

13. The computer-implemented method of claim 4, further comprising:
generating metrics about the execution of the task based on the received execution statistics.

14. The computer-implemented method of claim 4, further comprising:
generating an alarm when the execution of the task exceeds a threshold metric.

15. A system comprising:
execution resources to implement a benchmarking job according to an execution plan; and
a benchmarking service implemented by a second one or more electronic devices, the benchmarking service including instructions that upon execution cause the benchmarking service to:
generate an execution plan for a benchmarking job of at least one training or inference task corresponding to a machine learning model based on an identified machine learning model, identified training data, and at least one objective for the benchmarking job;
receive execution statistics about the execution of the at least one training or inference task performed by the machine learning model as a part of the benchmarking job according to the execution plan; and
update the execution plan based at least in part on the received execution statistics of the at least one training or inference task.

16. The system of claim 15, wherein the instructions upon execution further cause the benchmarking service to:
trigger execution of the execution plan on the execution resources.

17. The system of claim 15, wherein the generation of the execution plan is further based on at least one of hardware available to a user requesting the benchmarking job, available jobs to batch with the task, previous execution of the task to be run as a job, and previous execution of similar jobs.

18. The system of claim 15, wherein the generation of the execution plan includes executing the training of a model of the task to determine what hardware is capable of executing the task and meet the objective.

19. The system of claim 15, wherein the execution of the task as a part of the benchmarking job according to the execution plan occurs in a virtual machine.

20. The system of claim 15, wherein the execution of the task as a part of the benchmarking job according to the execution plan occurs in a container.

* * * * *